United States Patent
Wang et al.

(10) Patent No.: US 9,334,340 B2
(45) Date of Patent: *May 10, 2016

(54) METHOD FOR MAKING PHOSPHORATED POLYMER

(71) Applicants: Tsinghua University, Beijing (CN); HON HAI PRECISION INDUSTRY CO., LTD., New Taipei (TW)

(72) Inventors: Li Wang, Beijing (CN); Xiang-Ming He, Beijing (CN); Jian-Guo Ren, Beijing (CN); Wei-Hua Pu, Beijing (CN); Jian-Jun Li, Beijing (CN); Jian Gao, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 14/526,452

(22) Filed: Oct. 28, 2014

(65) Prior Publication Data

US 2015/0051354 A1    Feb. 19, 2015

Related U.S. Application Data

(63) Continuation of application No. 12/720,596, filed on Mar. 9, 2010, now Pat. No. 8,440,786, and a continuation of application No. 13/862,777, filed on Apr. 15, 2013, now Pat. No. 8,916,676.

(30) Foreign Application Priority Data

Mar. 18, 2009    (CN) .......................... 2009 1 0080304

(51) Int. Cl.
| | |
|---|---|
| *C08F 8/40* | (2006.01) |
| *H01M 4/60* | (2006.01) |
| *C08F 230/02* | (2006.01) |
| *C08G 79/02* | (2006.01) |
| *H01M 10/0525* | (2010.01) |

(52) U.S. Cl.
CPC .................. *C08F 8/40* (2013.01); *C08F 230/02* (2013.01); *H01M 4/60* (2013.01); *H01M 4/604* (2013.01); *H01M 10/0525* (2013.01)

(58) Field of Classification Search
CPC ....................................................... C08F 8/40
USPC ......... 528/398; 525/340; 429/209, 218, 231.9
See application file for complete search history.

(56) References Cited

U.S. PATENT DOCUMENTS 8,916,676 B2 *  12/2014  Wang ........................ C08F 8/40
                                                                       528/398

* cited by examiner

*Primary Examiner* — Duc Truong
(74) *Attorney, Agent, or Firm* — Novak Druce Connolly Bove + Quigg LLP

(57) ABSTRACT

This disclosure is related to a method for making a phosphorated polymer for electrochemical reversible lithium storage. A mixture including organic polymer and phosphorus is first heated and then cooled down to room temperature. The mixture is immersed in an alkaline solution after cooling own to room temperature. The pH of the mixture is adjusted to be neutral after immersing in the alkaline solution. The alkaline solution is removed.

8 Claims, 2 Drawing Sheets

METHOD FOR MAKING PHOSPHORATED POLYMER

RELATED APPLICATIONS

This application is a continuation application of U.S. patent application Ser. No. 13/862777, filed on Apr. 15, 2013 now U.S. Pat. No. 8,916,676, and entitled, "METHOD FOR MAKING PHOSPHORATED POLYMER," which is a continuation application of U.S. patent application Ser. No. 12/720,596, filed on Mar. 9, 2010 now U.S. Pat. No. 8,440,786, and entitled, "PHOSPHORATED POLYMER, METHOD FOR MAKING THE SAME, AND LITHIUM-ION BATTERY USING THE SAME," which claims all benefits accruing under 35 U.S.C. §119 from China Patent Application No. 200910080304.2, filed on Mar. 18, 2009 in the China Intellectual Property Office.

BACKGROUND

1. Technical Field

The present disclosure relates to a phosphorated polymer for electrochemical reversible lithium storage, method for making the same, and a lithium-ion battery using the same.

2. Description of Related Art

Lithium-ion batteries are used as portable power sources for a wide variety of electronic devices, such as cellular phones, notebook computers, and camcorders.

At present, graphite is used as an anode material for lithium-ion batteries, but higher capacity alternatives are being actively pursued. Among the many possible alternatives, a lot of work has been devoted to Sn-based oxide, Si-based composite, transition metal oxide, metal nitride, and metal phosphide systems, due to their ability to react reversibly with large amounts of Lithium (Li) per formula unit. However, the metal phosphides such as, $MnP_4$, $CoP_3$, $CuP_2$, $Cu_3P$, $FeP_2$, $Li_2CuP$, $TiP_2$ are inorganic composites that have bad cycle performance.

In one article, entitled "Black Phosphorus and its Composite for Lithium Rechargeable Batteries" by Hun-Joon Sohn et al., Advanced materials, Vol 19, P 2465-2468 (2007), a black P-carbon composite and method for making the same is disclosed. The black P-carbon composite includes orthorhombic black phosphorus and carbon modification, and it can be applied as an anode material for lithium-ion batteries. However, the orthorhombic black phosphorus is expensive and the black P-carbon composite is hard to make. Thus, the cost of the lithium-ion batteries is increased.

What is needed, therefore, is to provide a phosphorated anode material for lithium-ion batteries which is inexpensive and easy to make.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout several views.

DETAILED DESCRIPTION

Figure 1:
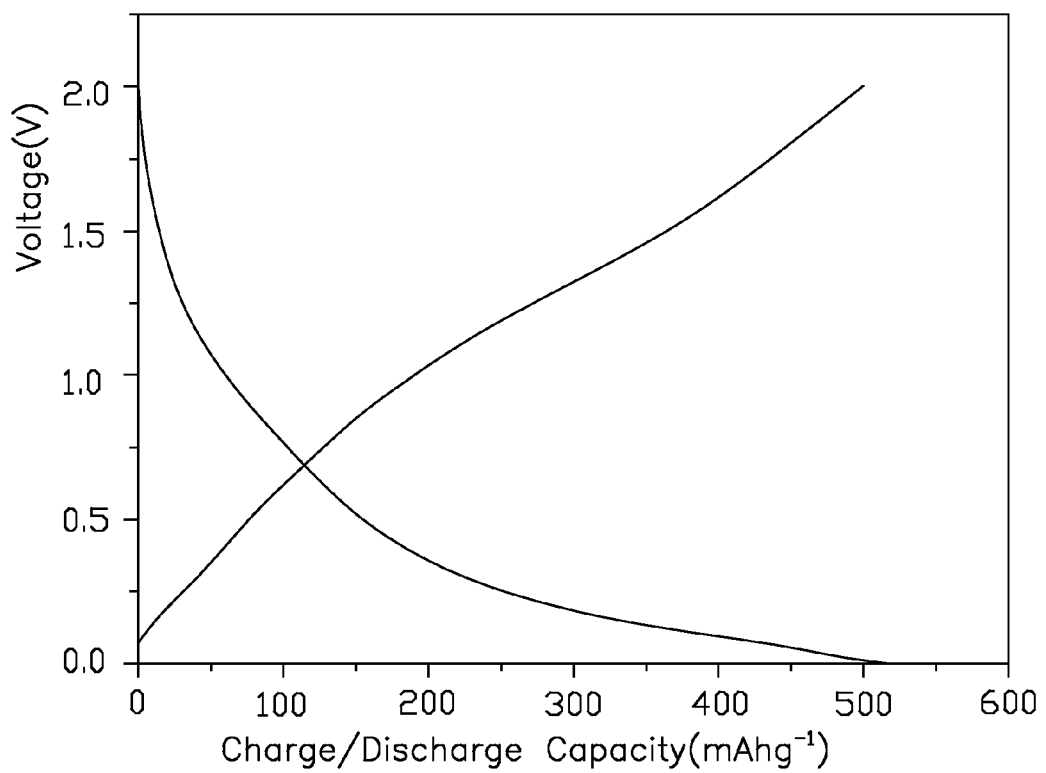
FIG. 1 is a voltage profile of charge/discharge performance of a lithium-ion battery according to an embodiment.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

A phosphorated polymer for electrochemical reversible lithium storage of one embodiment is a conductive polymer which includes a conductive polymer main-chain and a side-chain connected to the conductive polymer main-chain. The side-chain can be an electrochemically active phosphorated group Pm (phosphorus atoms cluster and/or covalent phosphorus structure). Furthermore, the side-chain can include functional groups R1 and R2.

The structure unit of the phosphorated polymer can be at least one of

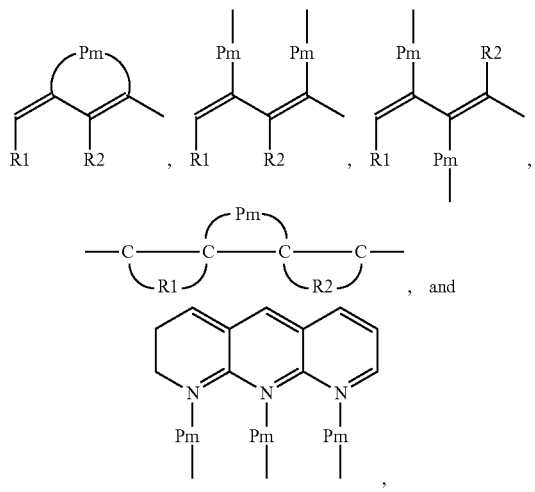

where m is an integer from 1 to 12 and means a number of P atoms in the phosphorated group Pm; adjacent P atoms in the phosphorated group Pm are connected with each other by covalent bond; N is a number of repetitive units; R1 and R2 can be methyl ($—CH_3$), chloromethyl, dichloromethyl, difluoromethyl, fluoromethyl, ether group, fluorine group, chlorine group, cyanogen group, benzene group, amino group ($—NH_2$), hydrogen group, or alkyl ($—CnH_{2n+1}$).

The weight percentage of the phosphorus in the phosphorated polymer can range from about 10% to about 85%. The charge/discharge capacity of the phosphorated polymer can range from about 250 mAh/g to about 1500 mAh/g. The phosphorated polymer can be made by a dehydrogenation reaction between an organic polymer and phosphorus.

A method for making the phosphorated polymer includes following steps:

step (a), mixing the organic polymer with the phosphorus to obtain a mixture, wherein the weight ratio of the organic polymer to the phosphorus ranges from about 1:10 to about 4:1;

step (b), drying the mixture in an inert atmosphere or vacuum, wherein the drying temperature ranges from about 50° C. to about 120° C.;

step (c), heating the mixture which has been dried in an inert atmosphere so that the phosphorus sublimes and reacts with the organic polymer to form a preform, wherein the heating temperature ranges from about 250° C. to about 600° C.;

step (d), cooling down the preform and immersing the preform in an alkaline solution to remove residual phosphorus;

step (e), adjusting the pH of the preform to be neutral; and step (f), drying the preform to obtain the phosphorated polymer.

In step (a), the mixture can be obtained by milling process so that the organic polymer and the phosphorus are mixed uniformly. Alternatively, the mixture can be obtained by the following substeps of:

step (a1), dissolving the organic polymer in a solvent to obtain a solution; and step (a2), mixing phosphorus into the solution.

In step (a2), the solvent can be acetonitrile, acetone, N,N-dimethyl formamide, N-methyl pyrrolidone (NMP), tetrahydrofuran (THF), water, or ethanol.

The organic polymer can be provided in a form of powder, particles, or fibers, that it can react with the phosphorus completely. The powder can be a plurality of nano-scale particles. The organic polymer can be any suitable organic polymer which can have a dehydrogenation reaction with the phosphorus at the heating temperature in step (c). The organic polymer can be polyethylene, poly1,2-chloride ethylene, polyvinylidenechloride, polytetrafluoroethylene (PTFE), polyvinyl chloride (PVC), polyvinylidene fluoride(PDVF), polyvinyl fluoride (PVF), polystyrene, polyethylene oxide, polyacrylonitrile (PAN), polypropylene chloride, or polymethyl methacrylate. The phosphorus can be red phosphorus, white phosphorus, or black phosphorus.

In step (b), the mixture can be dried for a period of time from about 8 hours to 48 hours so that the water and impurities in the mixture are vaporized. The inert atmosphere can be nitrogen gas or rare gas such as argon or helium.

In step (c), the mixture can be heated in a sealed reacting room such as a reacting kettle for a period of time from about 1 hour to about 48 hours.

In step (d), the preform can be cooled down to room temperature and the alkaline solution can comprise of ammonia, water solution of sodium hydroxide, or water solution of potassium hydroxide.

In step (e), adjusting the pH of the preform can include the substeps of:

step (e1), neutralizing the alkaline solution with an acid solution; and step (e2), rinsing the preform with deionized water until the deionized water becomes neutral.

In step (e1), the acid solution can be water solution of sulfuric acid, water solution of hydrochloric acid, or water solution of hydrofluoric acid.

In step (f), the preform can be dried for a period of time from about 6 hours to 48 hours at a temperature from about 50° C. to about 120° C.

When the phosphorated polymer is applied in a lithium-ion battery for electrochemical reversible lithium storage, the lithium-ion battery can include an anode, a cathode, a separator membrane, and an electrolyte. The anode includes the phosphorated polymer described above. The cathode can be made of cathode active material such as lithium cobaltate ($LiCoO_2$), lithium nickel cobaltate, lithium nickel oxides ($LiNiO_2$), lithium manganese oxide ($LiMnO_2$), or lithium iron phosphate ($LiFePO_4$). The electrolyte generally includes at least one solvent and lithium metal salt. The lithium metal salt is lithium hexafluorophosphate ($LiPF_6$). The solvent can be ethylene carbonate, propylene carbonate, dimethly carbonate, diethyl carbonate, dipropyl carbonate, ethyl methyl carbonate etc. Further, an additive can be added into the electrolyte.

EXAMPLE 1

In example 1, the phosphorated polymer of one embodiment is made by the following steps of:

step (1a), mixing the polyacrylonitrile with the red phosphorus to obtain a mixture, wherein the weight ratio of the organic polymer to the phosphorus is 1:4;

step (1b), drying the mixture in dry high purity nitrogen gas for 8 hours, wherein the drying temperature is 60° C.;

step (1c), heating the mixture in a sealed reacting kettle filled with dry high purity nitrogen gas so that the red phosphorus sublimes and reacts with the polyacrylonitrile to form a preform, wherein the heating temperature is 450° C. and heating time is 12 hours;

step (1d), cooling down the preform to room temperature and immersing the preform in water solution of sodium hydroxide;

step (1e), neutralizing the water solution of sodium hydroxide with water solution of hydrochloric acid and rinsing the preform with deionized water until the deionized water becomes neutral; and step (1f), drying the preform for 14 hours at a temperature of 60° C.

In step (1a), the polyacrylonitrile is provided in the form of particles with a purity higher than that of industrial grade polyacrylonitrile. In one embodiment, the purity of the polyacrylonitrile is about 98% or greater than 98%. The weight-average molecular weight (Mw) of the polyacrylonitrile is 86200, and the number-average molecular weight (Mn) of the polyacrylonitrile is 22600. The polyacrylonitrile is dissolved in N,N-dimethyl formamide before mixing with the red phosphorus.

In step (1c), the preform includes the phosphorated polymer and the residual phosphorus. The phosphorated polymer includes the conductive polymer main-chain and a side-chain connected to the conductive polymer main-chain. The side-chain is an electrochemically active phosphorated group Pm. The phosphorated group Pm is transformed from the red phosphorus during the dehydrogenation reaction.

The structure unit of the phosphorated polymer is

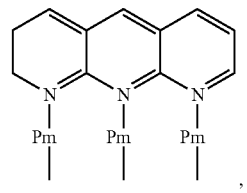

where m is an integer from 1 to 12 and means a number of P atoms in the phosphorated group Pm; adjacent P atoms in phosphorated group Pm are connected with each other by covalent bond. Two or more tan two conductive polymer main-chains are connected with each other via the phosphorated group Pm. A measurement by an element analyzer of one embodiment finds that the weight percentage of the red phosphorus in the phosphorated polymer is 56%.

Furthermore, an embodiment of a lithium-ion battery, comprising of an embodiment of the phosphorated polymer of example 1 is provided. The anode includes an electrode and a nickel foam current collector. The electrode includes an embodiment of the e phosphorated polymer of example 1, a bonder, a conductive agent and a dispersant with a weight ratio of 80:10:5:5. The bonder is poly(tetrafluoroethylene), the conductive agent is acetylene black and conductive graphite with a weight ratio of 1:1, and the dispersant is an ethanol. The cathode is a lithium metal sheet. The separator membrane in this embodiment is a CELGARD 2400 microporous polypropylene film. The electrolyte is 1 mol/L mixture solution of $LiPF_6$ and a mixture solvent of ethylene carbonate, diethyl carbonate and dimethly carbonate with a volume ratio of 1:1:1.

Figure 2:
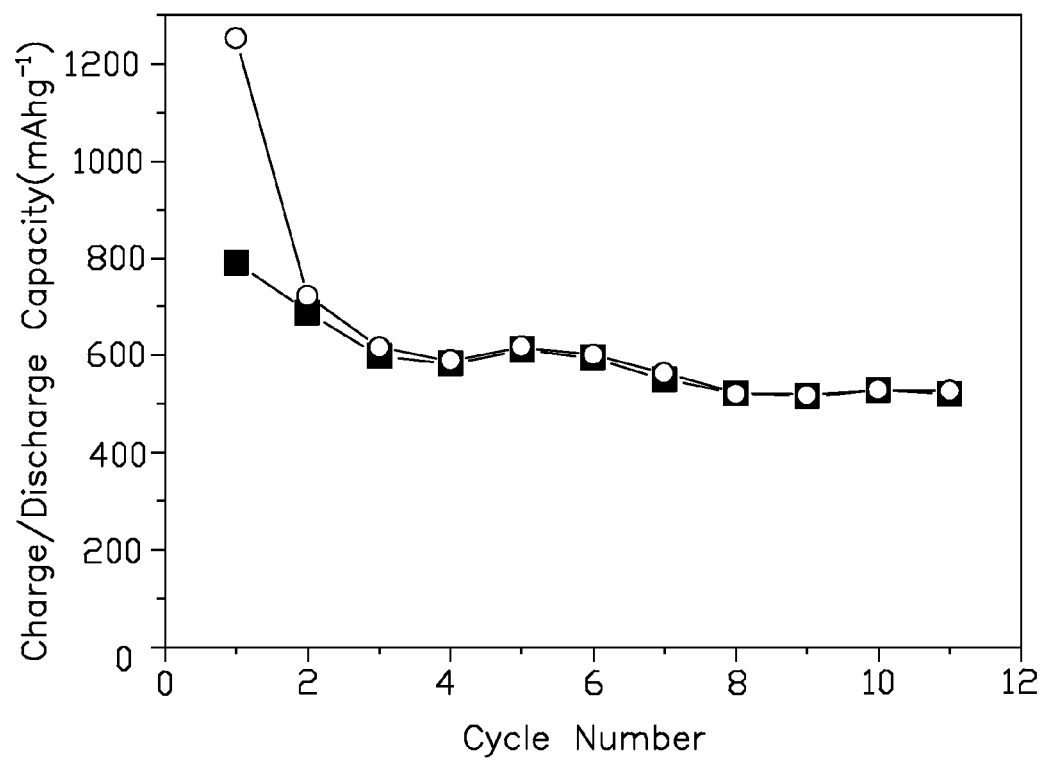
FIG. 2 is a charge/discharge capacity profile of cycle performances of a lithium-ion battery according to an embodiment.

A charge/discharge performance of one embodiment of the lithium-ion battery is tested. The open circuit voltage of the lithium-ion battery ranges from about 2.6V to about 2.8V. The charge/discharge capacity of the first cycle is 1200 mAh/g. The charge/discharge capacity is greater than 500 mAh/g after 11 cycles. Referring to FIG. 1, a charge/discharge performance of an embodiment of the lithium-ion battery in example 1 is shown. The abscissa axis represents charge/discharge capacity and the ordinate axis represents voltage. The coulombic efficiency during charge/discharge of the lithium-ion battery is greater than 95%. Referring to FIG. 2, cycle performances of the lithium-ion battery of one embodiment in example 1 is shown. The abscissa axis represents cycle number and the ordinate axis represents charge/discharge capacity.

EXAMPLE 2

In example 2, the phosphorated polymer of one embodiment is made by the following steps of:
  step (2a), mixing the polyvinyl chloride (PVC) with the red phosphorus to obtain a mixture, wherein the weight ratio of the organic polymer to the phosphorus is 1:2;
  step (2b), drying the mixture in dry high purity argon gas for 8 hours, wherein the drying temperature is 80° C.;
  step (2c), heating the mixture in a reacting kettle filled with dry high purity nitrogen gas so that the red phosphorus sublimes and reacts with the polyvinyl chloride to form a preform, wherein the heating temperature is 400° C. and heating time is 8 hours;
  step (2d), cooling down the preform to room temperature and immersing the preform in an ammonia to remove residual phosphorus; and
  step (2e), neutralizing the ammonia with water solution of sulfuric acid and rinsing the preform with deionized water until the deionized water becomes neutral; and
  step (2f), drying the preform for 12 hours at a temperature of 80° C.

In step (2a), the polyvinyl chloride is provided in form of particles with a purity higher than that of industrial grade polyvinyl chloride. In one embodiment, the purity of the polyvinyl chloride is about 99% or greater than 99%. The weight-average molecular weight (Mw) of the polyvinyl chloride is 62000, and the number-average molecular weight (Mn) of the polyvinyl chloride is 35000. The polyvinyl chloride is dissolved in tetrahydrofuran before mixing with the red phosphorus.

In step (2c), the preform includes the phosphorated polymer and the residual phosphorus. The phosphorated polymer includes the conductive polymer main-chain and a side-chain connected to the conductive polymer main-chain. The side-chain includes an electrochemically active phosphorated group Pm and the functional groups R1 and R2. The functional groups R1 and R2 can influence physical properties and chemical properties of the phosphorated polymer by changing the distribution of the electron conjugated structure of the phosphorated polymer. The degree of polymerization of the phosphorated polymer is less than or equal to the degree of polymerization of the polyvinyl chloride.

The structure unit of the phosphorated polymer is

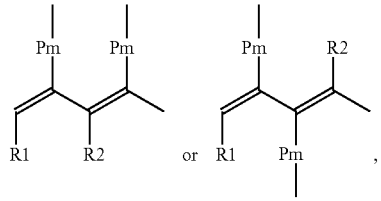

where m is an integer from 1 to 12 and means a number of P atoms in the phosphorated group Pm; adjacent P atoms in phosphorated group Pm are connected with each other by covalent bond; R1 and R2 is hydrogen group (H—). Two or more than two conductive polymer main-chains are connected with each other via the phosphorated group Pm. A measurement by an element analyzer finds that the weight percentage of the red phosphorus in the phosphorated polymer is 75%.

Furthermore, the adjacent side-chain can connected with each other to form a structure unit such as

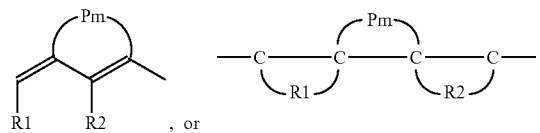

Furthermore, an embodiment of a lithium-ion battery, comprising of an embodiment of the phosphorated polymer of example 2 is provided. The anode includes an electrode and a copper foil current collector. The electrode includes an embodiment of the e phosphorated polymer of example 2, a bonder, a conductive agent and a dispersant with a weight ratio of 80:10:5:5. The bonder is polyvinylidene fluoride, the conductive agent is acetylene black and conductive graphite with a weight ratio of 1:1, and the dispersant is an ethanol. The cathode is a lithium metal sheet. The separator membrane in this embodiment is a CELGARD 2400 microporous polypropylene film. The electrolyte is 1 mol/L mixture solution of $LiPF_6$ and a mixture solvent of ethylene carbonate, diethyl carbonate and dimethly carbonate with a volume ratio of 1:1:1.

A charge/discharge performance of one embodiment of the lithium-ion battery is tested. The open circuit voltage of the lithium-ion battery ranges from about 2.6V to about 2.8V, and the charge/discharge capacity of the first cycle is 1000 mAh/g. The charge/discharge capacity is greater than 450 mAh/g after 10 cycles.

EXAMPLE 3

In example 3, the phosphorated polymer of one embodiment is made by the following steps of:
  step (3a), mixing the polypropylene chloride with the red phosphorus to obtain a mixture, wherein the weight ratio of the polypropylene chloride to the phosphorus is 1:1;
  step (3b), drying the mixture in the vacuum for 4 hours, wherein the drying temperature is 60° C.;

step (3c), heating the mixture in a sealed reacting kettle filled with dry high purity argon gas so that the red phosphorus sublimes and reacts with thepolypropylene chloride to form a preform, wherein the heating temperature is 420° C. and heating time is 10 hours;

step (3d), cooling down the preform to room temperature and immersing the preform in water solution of sodium hydroxide to remove residual phosphorus; and step (3e), rinsing the preform with deionized water until the deionized water becomes neutral; and step (3f), drying the preform for 12 hours at a temperature of 80° C.

In step (3a), the polypropylene chloride is provided in form of particles with a purity higher than that of industrial grade polypropylene chloride. In one embodiment, the purity of the polypropylene chloride is about 99% or greater than 99%. The weight-average molecular weight (Mw) of the polyvinyl chloride is 60000, and the number-average molecular weight (Mn) of the polyvinyl chloride is 32000. The polypropylene chloride is dissolved in tetrahydrofuran before mixing with the red phosphorus.

In step (3c), the preform includes the phosphorated polymer, the residual phosphorus and a phosphorous oxide. The phosphorated polymer includes the conductive polymer main-chain and a side-chain connected to the conductive polymer main-chain. The side-chain includes an electrochemically active phosphorated group Pm and the functional groups R1 and R2. The degree of polymerization of the phosphorated polymer is less than or equal to the degree of polymerization of the polypropylene chloride.

The structure unit of the phosphorated polymer is

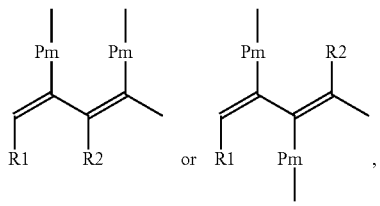

where m is an integer from 1 to 12 and means a number of P atoms in the phosphorated group Pm; adjacent P atoms in phosphorated group Pm are connected with each other by covalent bond; R1 and R2 is alkyl (–CH$_3$). Two or more than two conductive polymer main-chains are connected with each other via the phosphorated group Pm. A measurement by an element analyzer finds that the weight percentage of the red phosphorus in the phosphorated polymer is 63%.

Furthermore, an embodiment of a lithium-ion battery, comprising of an embodiment of the phosphorated polymer of example 3 is provided. The anode includes an electrode and a copper foil current collector. The electrode includes the phosphorated polymer, a bonder, and a conductive agent with a weight ratio of 8:1:1. The bonder is a polyvinylidene fluoride, the conductive agent is acetylene black, and the dispersant is an N-methyl pyrrolidone (NMP). The cathode is a lithium metal sheet. The separator membrane is a CELGARD 2400. The electrolyte is 1 mol/L mixture solution of LiPF$_6$ and a mixture solvent of ethylene carbonate, diethyl carbonate and dimethly carbonate with a volume ratio of 1:1:1.

A charge/discharge performance of one embodiment of the lithium-ion battery is tested. The open circuit voltage of the lithium-ion battery ranges from about 2.6V to about 2.8V, and the charge/discharge capacity of the first cycle is 1500 mAh/g.

It is to be understood that the above-described embodiments are intended to illustrate rather than limit the disclosure. Variations may be made to the embodiments without departing from the spirit of the disclosure as claimed. The above-described embodiments illustrate the disclosure but do not restrict the scope of the disclosure.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

What is claimed is:

1. A method for making a phosphorated polymer for electrochemical reversible lithium storage comprising steps of:
   heating a mixture comprising an organic polymer and a phosphorus;
   cooling down the mixture to room temperature;
   immersing the mixture in an alkaline solution;
   adjusting pH of the mixture to be neutral; and
   removing the alkaline solution.

2. The method of claim 1, wherein the heating the mixture comprises heating the mixture in an inert atmosphere or vacuum.

3. The method of claim 1, wherein the heating the mixture comprises heating the mixture in a heating temperature in a range from about 250° C. to about 600° C.

4. The method of claim 1, wherein a weight ratio of the organic polymer to the phosphorus ranges from about 1:10 to about 4:1.

5. The method of claim 1, wherein the heating the mixture comprises subliming and reacting the phosphorus with the organic polymer.

6. The method of claim 1, wherein the phosphorus is selected from the group consisting of red phosphorus, white phosphorus and black phosphorus.

7. The method of claim 1, wherein the organic polymer is selected from the group consisting of polyethylene, polyl,2-vinylidene chloride, polyvinylidenechloride, polytetrafluoroethylene, polyvinyl chloride, polyvinylidene fluoride, polyvinylidene fluoride, polystyrene, polyethylene oxide, polyacrylonitrile, polypropylene chloride, and polymethyl methacrylate.

8. The method of claim 1, wherein the removing the alkaline solution comprising drying.

* * * * *